March 24, 1931.  W. W. HEINZE  1,797,551
SPACING INSTRUMENT
Filed April 11, 1929  2 Sheets-Sheet 2
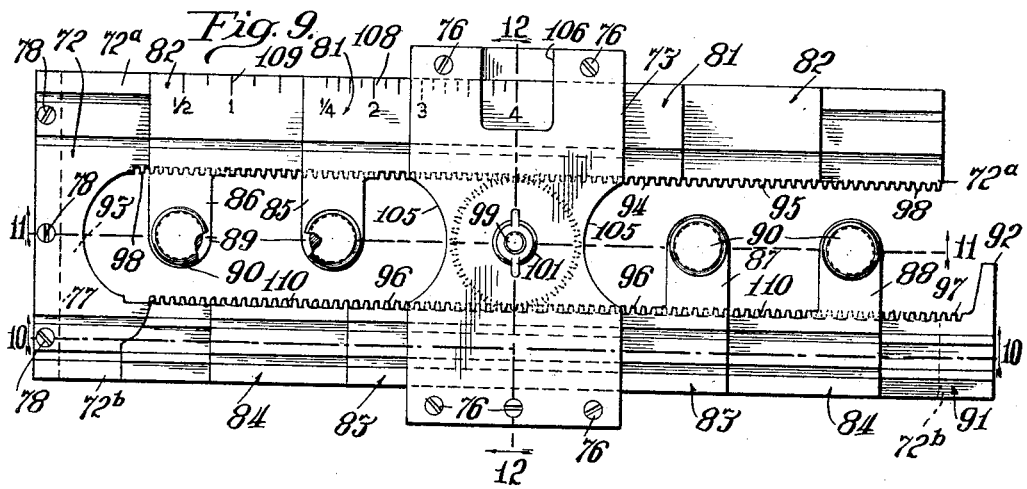
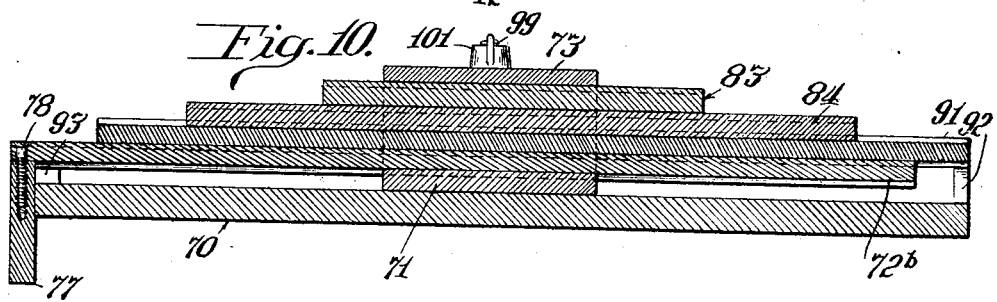
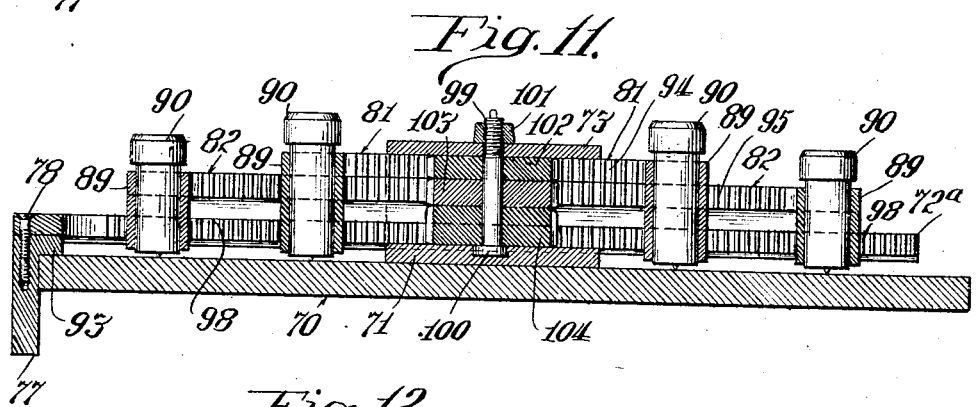
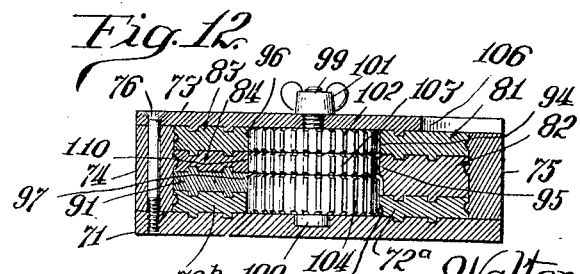
Inventor
Walter W. Heinze
By Ernest E. Tupes
Attorney.

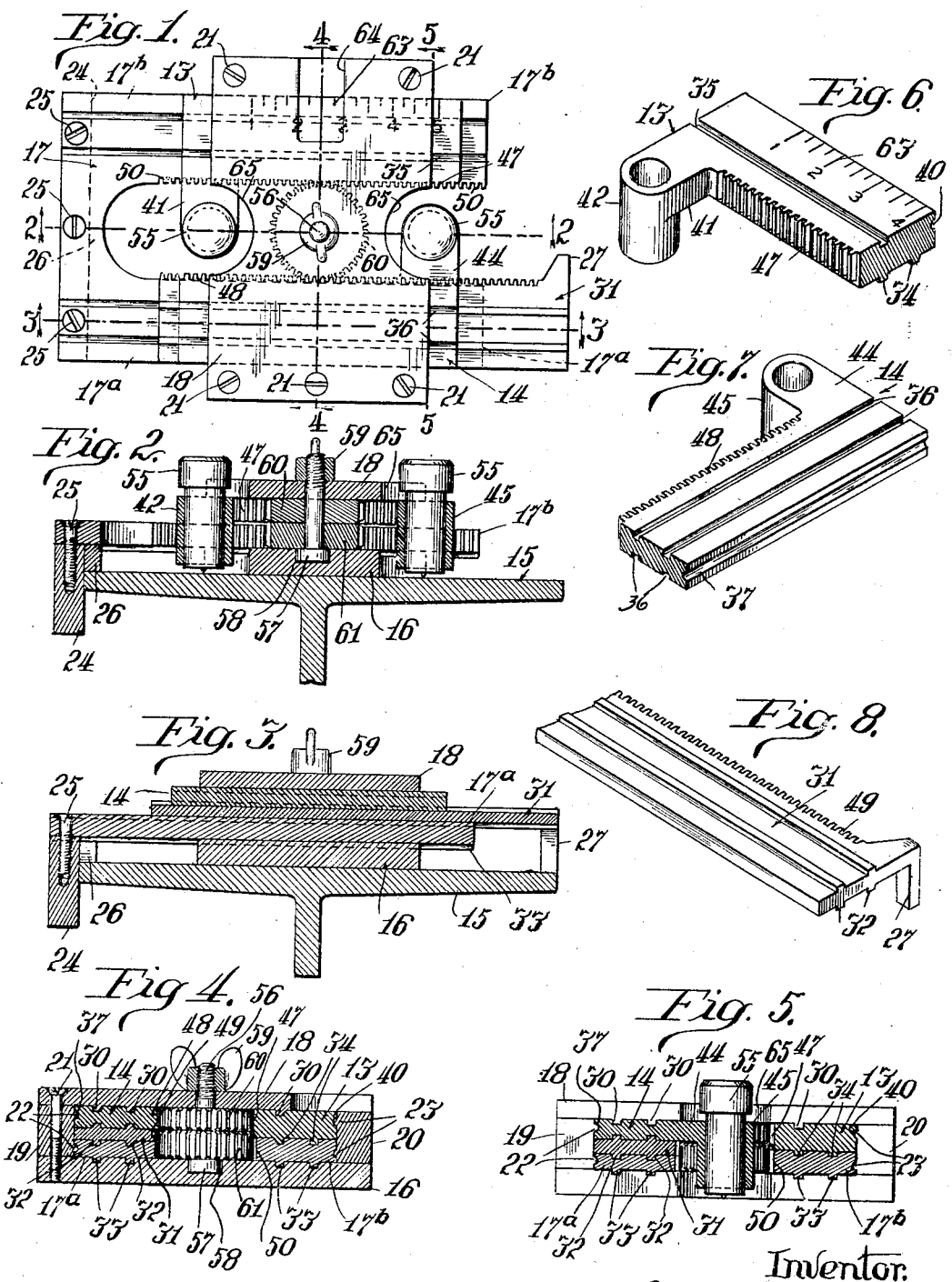

Patented Mar. 24, 1931

1,797,551

UNITED STATES PATENT OFFICE

WALTER W. HEINZE, OF CHICAGO, ILLINOIS

SPACING INSTRUMENT

Application filed April 11, 1929. Serial No. 354,237.

The invention relates to spacing instruments and more particularly it relates to a device adapted for marking the locations of the centers of a plurality of rivet holes to be punched or otherwise formed in any material wherein it is desirable that holes be arranged in a series of straight lines. The invention has one of its most important adaptations in the fabrication of structural steel wherein various structural sections are fastened together by a plurality of rivets or bolts arranged in longitudinal lines commonly known as rivet lines and the spacing of such rows is known as the gauge. In fabrication of I or H beams and of cover plates, provided for reenforcing the flanges of such beams and the built up flanges of plate girders, the general practice is to provide the rivet holes in two or four or other even number of parallel rows, symmetrically positioned on either side of the longitudinal center line of the beam or girder. The holes are located by providing templates constructed of card board, white pine or the like, the templates being clamped to the face of the beam or the plate in which the holes are to be punched. The template is prepared by boring or punching holes therein having the same relative positions as the beam or plate to be punched. After clamping the template in position on the beam or plate, a punch point is used to dent or prick the surface of the beam, the holes in the template serving as guides for the accurate location of such marks. The template is then removed and the marked beam is ready for the punch press wherein the beam has holes punched through it in alignment with the marks located by the use of the template. The template method of locating holes requires a great deal of time and template material which is expensive and one of the objects of my invention is the provision of an instrument, by means of which the use of template plates can be dispensed with.

As is well known to those familiar with structural steel construction there is in most cases some over run or excess in width of the flanges of beams and of the legs of angles and the like except for the sections of minimum thickness. This over run is not always uniform throughout the length of a member and the edges have some slight irregularities, making it a difficult and a time consuming process to mark the rivet lines symmetrically about the longitudinal center line of the web of the I beam or of the H sections by the usual method of using wooden or paper templates and another object of the invention is to provide an improved device operable to accurately and quickly locate a plurality of lines of holes in parallel relation at any predetermined spacing, without the use of templates.

Another object of the invention is to provide a device of the class described which is operable to quickly and precisely locate a plurality of parallel lines of holes in the flanges of I or H beams or similar members in symmetrical or other predetermined relation to the center line of the webs of such beams or members.

A further object of the invention is the production of a device of the kind described which can be easily adjusted to change the gauge or spacing of the parallel lines of holes.

A further object of the invention is the production of a device of the kind described, which is simple in construction, of a small number of parts, easy to manufacture, durable, reliable and highly satisfactory for its intended purpose.

Many other objects and advantages of the construction herein shown and described will be obvious to those skilled in the art from the disclosure herein given.

To this end my invention consists in the novel construction, arrangement and combination herein shown and described and more particularly pointed out in the claims.

In the drawings wherein like numerals indicate like or corresponding parts:

Fig. 1 is a top plan view of one embodiment of the invention as it appears when completely assembled;

Fig. 2 is a sectional view along the line 2—2 of Fig. 1;

Fig. 3 is a sectional view along the line 3—3 of Fig. 1;

Fig. 4 is a sectional view along the line 4—4 of Fig. 1;

Fig. 5 is a sectional view along the line 5—5 of Fig. 1;

Figs. 6, 7, and 8 are perspective views in part or in whole of certain of the members comprising the device shown in disassembled relation;

Fig. 9 is a plan view of another embodiment of my invention adapted for providing four parallel lines of holes;

Fig. 10 is a section along the line 10—10 of Fig. 9;

Fig. 11 is a section along the line 11—11 of Fig. 9; and

Fig. 12 is a section along the line 12—12 of Fig. 9.

The device is shown as mounted on the top flange of an I beam 15 with a base plate 16 resting on the beam. The device is equally as well adapted for use in marking plates and other sections in which holes are to be punched.

Referring now more particularly to the drawings, the numerals 13 and 14 generally designate a pair of members hereinafter called punch guides. The punch guides 13 and 14 are shown in perspective in Figs. 6 and 7, respectively, and are shown in their assembled position in Figs. 1, 4, and 5. The punch guides 13 and 14 are slidably mounted in the fixed portion of the device. The fixed portion of the device includes a base plate 16 and a cap plate 18 separated by spacing blocks 19 and 20 fastened together by countersunk screw bolts 21 so as to be relatively immovable and to form a frame in which the other members of the device are transversely movable. Inasmuch as the frame is made up of plates 16 and 18 and of blocks 19 and 20, all of which are symmetrical relative to the line 4—4 of Fig. 1, the axis of the frame coinciding with the line 4—4 will hereinafter be described and referred to as the longitudinal axis of the frame.

The spacing blocks 19 and 20 have a plurality of semi-circular tongues 22 and 23, respectively, formed thereon. A transversely movable U-shaped guide member 17 is mounted in the device. The head of the member 17 is in substantial alignment with the left edge of the flange of the I beam 15 and its arms 17a and 17b extend to the right as observed in Figs. 1 to 3. A longitudinal bar 24 is fastened to the underside of the guide member 17 by means of a plurality of countersunk screw bolts 25, the inner edge of the bar thereby forming a straight edge keeping the device in alignment with the I beam 15, a plate or other member being marked as a preliminary to punching or drilling holes therein. Bar 24 is parallel to the center line of the device and exactly perpendicular to the transversely movable members. The base plate 16 is relatively narrow as compared with the width of the device and to prevent any tendency of the device to tilt about the plate a stem 26 is provided on the under surface of the guide member 17. A control member 31, shown in perspective in Fig. 8, is slidably mounted between the arm 17a and the punch guide 14. The outer end of the member 31 has a downwardly projecting stem 27, the lower end of which contacts with the upper face of the flange of the I beam 15. The lower end of the stems 26 and 27 are in alignment with the bottom of the plate 16 as a result of which the device is supported firmly on the upper flange of the I beam 15, or of any other member upon which the device is positioned as a preliminary to locating spaced rows of rivet holes therein.

Punch guides 13 and 14, the slide member 31, and the arms 17a and 17b of the U-shaped guide member are all transversely slidable in the device and otherwise held against movement by a plurality of tongues and grooves hereinafter more particularly described and designated. The plate 18 has a plurality of tongues 30 one of which is slidable in a corresponding slot 35 in the upper face of the punch guide 13. The remaining tongues 30 similarly engage slots 36 in the upper face of the punch guide 14. The control member 31 is provided with a plurality of tongues 32 the upper ones of which engage slots 36 in the under face of the punch guide 14, and the other of which engage slots correspondingly formed in the upper face of the arm 17a. The arms 17a and 17b have a plurality of rectangular shaped tongues 33 on their lower face which suitably engage corresponding grooves of slots in the upper face of the base plate 16. The lower face of the punch guide 13 is provided with a pair of tongues 34 which suitably engage corresponding grooves in the upper face of the arm 17b. The punch guide 14 has a semi-circular slot 37 extending the full length of its outer vertical face and which operatively engages one of a pair of tongues 22 formed on the spacing block 19. The other of the tongues 22 on the spacing block 19 engages a corresponding slot in the outer edge of the arm 17a. A semi-circular groove 40 on the guide member 13 suitably engages one of a pair of corresponding tongues 23 formed on the spacing block 20. The other of the tongues 23 on the spacing block 20 engages a groove in the outside edge of the arm 17b.

The punch guide 13 has a laterally projecting stem 41 on the outer end of which is mounted a vertical, hollow, cylindrical member 42. The member 42 provides a mounting for one of a pair of center punches 55. The punch guide 14 is similarly equipped with a laterally extending stem 44 on the outer end of which is mounted a vertical, hollow, cylindrical member 45 in which another center punch 55 is mounted. The relative positions of the members 42 and 45 and the center punches therein contained are best shown in Figs. 1 and 2.

A plurality of vertical teeth formed on the inner faces of the punch guides 13 and 14 provide racks 47 and 48, respectively. A rack 49 is similarly provided on one edge of the member 31. When the members are assembled the rack 49 is positioned immediately underneath the rack 48 on the member 14.

A vertical pivot member 56 extends upwardly through the cap plate 18. The lower end of the pivot member 56 is provided with a cylindrical head 57 positioned in a countersunk hole 58 formed in the plate 16. The upper end of the pivot member 56 projects above the cap plate 18 to receive a wing nut 59. The pivot member 56 is positioned exactly on the longitudinal center line of the assembled device. The center line of the device is caused to coincide with the longitudinal center line of the beam or plate being marked as a preliminary to punching. The device is so constructed that when the bar 24 is placed with its inner face against one edge of the flange of the I beam 15 and the control member 31 shifted to bring the outer face of stem 27 into alignment with the other edge of the flange, the center line of the device and the center line of the I beam will be in exact alignment.

An upper pinion 60 and a lower pinion 61 are independently rotatably mounted on the pivot member 56. The pinion 60 operatively engages the rack 47 which is formed on the punch guide 13 and the rack 48, which is formed on the punch guide 14. The pinion 61 operatively engages both of the racks 49 and 50 which are located on the member 31 and arm 17b, respectively. By tightening the wing nut 59 the pinions 60 and 61 will be clamped together so as to prevent their rotation and all of the slidably movable members will be held fixedly in position.

It is obvious that the device can be centered on beams or plates of any suitable width without shifting the positions of the guide members 13 and 14 carrying the center punches 55, this being accomplished by merely shifting the control member 31 and the U shaped guide member 17 relative to each other. By sliding the member 31 to the left, as observed in Fig. 1, the pinion 61 will be rotated in clockwise direction and this will move the member 17 to the right by reason of the engagement of the pinion 61 with the rack 50 on the arm 17b thereby bringing the bar 24 and the stem 27 closer together. Movement of the control member 31 to the right will rotate the pinion 61 in counterclockwise direction and cause the member 17 to move to the left and thereby increase the spacing between the bar 24 and the stem 27. This adaptation of the device to beams and plates of different widths by centering the device thereon is accomplished as stated without necessarily shifting the position of the punch guides 13 and 14 and the center punches 55 carried by the guides. Having centered the device, the various movable parts are then clamped against relative movement by tightening the thumb nut 59.

The punch guides 13 and 14 are normally mounted so that the punches 55 are symmetrically positioned on either side of the center line of the device. Since the pinion 60 engages the racks 47 and 48 on the guides 13 and 14, respectively, the guides can be moved towards the center line by pushing on the one or the other, the pinion causing a simultaneous and equal movement of the two guides and maintaining the equal spacing of the two punches 55 from the center line. Similarly the two guides 13 and 14 can be manipulated to increase the spacing of the punches and maintain their equal and symmetrical spacing relative to the center line of the device and of the beam 15. The device having been set to center on the particular beam to be marked and the punches 55 having been set for the desired gauge or spacing of the lines of rivets, the device is clamped by turning the thumb nut 59. Should it be desired to vary the spacing of the rows of rivets at any point in the beam, this is accomplished by loosening the nut 59 and manipulating the guides 13 and 14 to obtain the desired spacing and then again clamping the nut 59.

The beam or plate can be marked in rows, unsymmetrically spaced relative to the center line of the device. This is accomplished by releasing the screws 21 holding the cap plate 18 and the base plate 16 together and shifting either of the punch guides 13 or 14. This shifting is necessarily an amount equivalent to the pitch of one or more teeth forming the racks 47 and 48 on the particular guide 13 or 14 being shifted. The spacing of the teeth forming the racks 47 and 48 is preferably in fractions of an inch used in spacing of rivet lines, such for example as ⅛, ¼ inches, and the like.

The lateral edges of the cap plate 18 are provided with semi-circular recesses 65 to clear the cylindrical members 42 and 45 and to permit the punch guides 13 and 14 to be moved the maximum desired amount towards the center of the device. The outer edge of the punch guide 13 has a scale 63 formed on its upper face, the scale being so graduated and positioned as to indicate the distances from the center line that the center punches are for any and all positions. A rectangular shaped recess 64 is formed in the cap plate 18 to permit the operator to see the scale and read the gauge or spacing of the center punches 55 at any instant. Operation of the device is further illustrated by assuming that the I beam is a standard 15-inch, 42-pound section and that it is desired to provide a row of holes on either side of the flange with a gauge of 5½ inches or a distance of 2¾ inches of each row from the center line. This will be accomplished by setting the device with the longitudinal bar 24 in contact with the edge of the I beam flange and the punch guides 13 and 14 set so that the scale will show the desired spacing or gauge. In this position of the device a pair of holes spaced 5½ inches apart can be marked by pitting in the upper surface of the I beam flange. Two rows of such pits or indentations can be thus formed, such rows being 5½ inches apart and symmetrically positioned about the center line of the beam. The spacing of the pits or indentations in the rows is controlled by the amount the device is advanced after each operation of pitting.

In the event that it should be desired to arrange the rows of rivets unsymmetrically about the center line of the beam, as for example, assuming it is desired to have the left hand row, as observed in Fig. 2, spaced three inches from the center of the beam and the right hand row spaced two and one-half inches from the center of the beam, this adjustment can be made by proper positioning of the guides 13 and 14 in the device, such adjustment requiring only that the cap plate 18 be removed. Upon setting the device for any desired gauge or spacing of rows, the device is locked by tightening the nut 59 and the entire beam or any number of beams can be marked without further adjustment, if desired. The lines of rivets may also be spaced unsymmetrically by spacing or placing the device with its center line on either side of the center line of the flange of the beam being punched an amount equal to the desired eccentricity of spacing. The above mentioned spacings of three and two and one-half inches can be obtained by merely actuating the control member 31 to bring the center line of the device one-fourth of an inch away from the center line of the beam. The center punches 55, being five and one-half inches apart, and each two and three-quarter inches from the center line of the device, the quarter of an inch eccentricity of the device relative to the beam will increase the distance of one punch from the center line of the beam by one-quarter of an inch and diminish the other spacing an equal amount.

An alternative form of the device is shown in Figs. 9 to 12, inclusive, the alternative embodiment differing from the device already described and shown in Figs. 1 to 8, inclusive, in that provision is made for marking or pitting four rows of holes in the flange of a beam or of a cover plate or the like. The rows of holes may be spaced symmetrically on either side of the center line as in the embodiment already described or may be adjusted for unsymmetrical spacing of the rows by shifting punch guides corresponding to the punch guides 13 and 14, such guides being hereinafter more particularly described and enumerated.

The alternative device comprises a base plate 71 shown as positioned on a structural steel plate 70 for the purpose of pitting or punching the latter. A cap plate 73 is rigidly fastened to the base plate 71 by countersunk screw bolts 76. Spacing blocks 74 and 75 hold the base plate 71 and the cap plate 73 in spaced apart relation. The bolts 76 extend down through the spacing blocks 74 and 75 and serve to fixedly fasten the plates together.

Punch guides 81 and 82 are mounted on one side of the device so as to be transversely movable therein. Corresponding punch guides 83 and 84 are similarly mounted on the other side of the device. A U-shaped guide member 72, having arms 72a and 72b, is mounted in sliding contact with the upper surface of the base plate 71 and the lower surfaces of a control member 91. A longitudinal bar 77 is mounted on the under side of the guide member 72 and is fastened thereto by screw bolts 78. The bar 77 forms a straight edge serving to keep the device aligned with the plate 70. The bar 77 is parallel to the center line of the device and is exactly perpendicular to the transversely movable members. The various transverse sliding members are provided with a plurality of tongues and cooperating grooves similar to those shown for the device already described. The designating numerals for said tongues and grooves are omitted as unnecessary to an understanding of the operation of the device, since the operation of the two devices is similar.

A lug 93 is formed on the under face of the member 72 and a lug 92 similarly projects from the under face of the control member 91. The lugs 92 and 93 cooperate with the base plate 71 to prevent tilting of the device.

A pivot member 99 is centrally mounted in the device and projects upwardly through the cap plate 73. The member 99 has its upper end threaded to receive a thumb nut 101. A cylindrical head 100 is formed on the lower end of the member 99. Pinions 102, 103, and 104 are mounted, in the order named, to rotate independently on the pivot member 99. The inner faces of the control member 91 and of the arm 72a are provided with a plurality of teeth forming racks 97 and 98, respectively, with which the pinion 104 is operatively connected. The inner edges of the punch guides 83 and 84 likewise form racks 96 and 110, respectively, with which the pinions 102 and 103, respectively cooperate. Racks 94 and 95, respectively, are similarly formed on the inner edge of the punch guides 81 and 82. The pinions 102 and 103 similarly cooperate with the racks 94 and 95 to impart a sliding movement to the guides 81 and 82.

By manually pushing the control member 91 to the left, the guide member 72 will be moved a similar amount to the right by the resultant rotation of the pinion 104 thereby bringing the bar 77 and the stem 92 closer together and enabling the device to be centered on the work in the same way as for the embodiment already described. Movement of the member 91 to the right similarly spreads the stem 92 and the bar 77.

The punch guides, 81, 82, 83, and 84 are provided with stems 85, 86, 87, and 88, respectively, upon which hollow cylindrical shaped members 89 are mounted. A center punch 90 is positioned in each of the members 89. The cap plate 73 is provided with apertures 105 on either side to permit the adjacent members 89 to move inwardly without interference.

It is obvious that the guides 81 and 83 are movable inwardly and outwardly together independently of the other transversely movable members; also that the guide members 82 and 84 are movable together independently of the other transversely movable members, thereby enabling any desired spacing of rivet rows to be provided for in the same or different beams.

Graduated scales 108 and 109, respectively are formed on the upper surface of the punch guides 81 and 82. An aperture 106 is provided in the end of the cap plate 73 to enable the operator to read the scale on the upper surface of the punch guide 81.

For symmetrical spacing of the rows to be pitted and punched in the plate 70 or in the flange of H beams or the like, the device is assembled with the two outer cylindrical members 89 symmetrical about the center of the device and similarly the two inner members 89 equally spaced from the center line of the device. The device is clamped in this position by tightening the thumb nut 101 and then the work of pitting the individual holes can proceed. The pitting is done by striking the individual punches 90 with a hammer or the like. The holes in the parallel rows can be aligned or staggered by striking all or any number of the punches for each advance of the device along the beam.

The device can be adjusted for any desired unsymmetrical spacing of the rows relative to the plate or beam by removing the cap plate 73 and rearranging the position of the control member 72 relative to the punch guides 81, 82, 83, and 84, and of the punch guides to each other. The graduations of the scales on the punch guides 81 and 82 may be arranged as to indicate the distances of the punches from the center line of the work or they may, if desired, be graduated to show the spacings between the various lines of rivets.

It will be seen that I have provided a device operable for use in marking structural steel to indicate the position of rivet holes in rows, arranged symmetrically or unsymmetrically, as desired, about the center line of the work, without the use of template plates or other devices wherein the spacing in the same beam may be varied as desired or a large number of such beams may be similarly punched without change, such device being simple in construction and manipulation and highly satisfactory for its intended use.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, and a pair of apertured members transversely movable in the frame, the aperture of each member providing a mounting for a punch, the apertures being oppositely positioned relative to said longitudinal center line of the frame.

2. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, a pair of apertured members transversely movable in the frame, the aperture of each member providing a mounting for a punch, the apertures being oppositely positioned relative to said longitudinal center line of the frame, and means operatively connecting said apertured members whereby movement of one of said apertured members in a given direction relative to the frame causes a corresponding opposite movement of the other of said apertured members.

3. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, and a pair of apertured members transversely movable in the frame, the aperture of each member providing a mounting for a punch, the apertures being oppositely positioned relative to said longitudinal center line of the frame, said apertured members each having a rack on one face, a pinion operatively connecting said racks whereby movement of one of said apertured members causes an equal and opposite movement of the other of said apertured members.

4. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, a pair of apertured members transversely movable in the frame, the aperture of each member providing a mounting for a punch, the apertures being oppositely positioned relative to said longitudinal center line of the frame, means operatively connecting said apertured members whereby movement of one of said apertured members in a given direction relative to the frame causes a corresponding opposite movement of the other of said apertured members, and means operable to clamp said movable members in fixed relation to said frame.

5. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, a pair of apertured members transversely movable in the frame, the aperture of each member providing a mounting for a punch, the apertures being oppositely positioned relative to said longitudinal center line of the frame, one of said apertured members being graduated to provide a scale indicating the position of said apertures relative to said longitudinal center line.

6. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, a pair of apertured members transversely movable in the frame, the aperture of each member providing a mounting for a punch, the apertures being oppositely positioned relative to said longitudinal center line of the frame, one of said apertured members being graduated to provide a scale indicating the position of said apertures relative to said longitudinal center line, and means operable to clamp said movable members in fixed relation to said frame.

7. In a device of the kind described, a frame, a pair of members transversely movable in the frame, means operatively connecting said members whereby movement of one of said members in a given direction relative to the frame causes an equal movement of the other of said members in an opposite direction, each of said members having a vertically extending projection thereon, said projections being positioned on opposite sides of the center line of the frame and each having a face parallel to and equally distant from said center line, a pair of apertured members transversely movable in the frame, the aperture of each member providing a mounting for a punch, the apertures being oppositely positioned relative to said longitudinal center line, means operatively connecting said apertured members whereby movement of one of said apertured members in a given direction relative to the frame causes a corresponding opposite movement of the other of said apertured members, and means operable to clamp said movable members in fixed relation to said frame.

8. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, a plurality of pairs of apertured members transversely movable in said frame, the aperture of each member providing a mounting for a punch, the apertures of each pair being oppositely positioned relative to said longitudinal center line, each of said pairs of apertured members having means operatively connecting the members comprising such pair whereby movement of one of said paired members in a given direction relative to the frame causes a corresponding opposite movement of the other of said paired members, and means operable to clamp all of said movable members in fixed relation to said frame.

9. In a device of the kind described, a frame, a pair of members transversely movable in the frame, means operatively connecting said members whereby movement of one of said members in a given direction relative to the frame causes an equal movement of the other of said members in an opposite direction, each of said members having a vertically extending projection thereon, said projections being positioned on opposite sides of the center line of the frame and each having a face parallel to and equally distant from said center line, a plurality of pairs of apertured members transversely movable in said frame, the aperture of each member providing a mounting for a punch, the apertures of each pair being oppositely positioned relative to said longitudinal center line, each of said pairs of apertured members having means operatively connecting the members comprising such pair whereby movement of one of said paired members in a given direction relative to the frame causes a corresponding opposite movement of the other of said paired members, and means operable to clamp all of said movable members in fixed relation to said frame.

10. In a device of the kind described, a frame, a pinion rotatably mounted on the frame, means slidably mounted in the frame, said means cooperating with the pinion to locate the frame with its longitudinal axis in alignment with the longitudinal axis of an I beam flange or the like on which the frame is positioned, a plurality of pairs of apertured members transversely movable in said frame, the aperture of each member providing a mounting for a punch, the apertures of each pair being oppositely positioned relative to said longitudinal center line, each of said pairs of apertured members having means operatively connecting the members comprising such pair whereby movement of one of said paired members in a given direction relative to the frame causes a corresponding opposite movement of the other of said paired members, the adjacent members of each pair on one side of said center line being so graduated as to provide scales indicating the position of the apertures of one pair relative to the center line and relative to the apertures of the other pair of members, and means operable to clamp all of said movable members in fixed relation to said frame.

In witness whereof, I hereunto subscribe my name April, A. D., 1929.

WALTER W. HEINZE.